US008064889B2

(12) United States Patent
Griswold et al.

(10) Patent No.: US 8,064,889 B2
(45) Date of Patent: Nov. 22, 2011

(54) VIRTUAL CASINO HOST

(75) Inventors: Chauncey Griswold, Reno, NV (US); Harold E. Mattice, Gardnerville, NV (US); Christian Gadda, Las Vegas, NV (US); Richard Wilder, Sparks, NV (US); James W. Stockdale, Clio, CA (US)

(73) Assignee: IGT, Reno, NV (US)

( * ) Notice: Subject to any disclaimer, the term of this patent is extended or adjusted under 35 U.S.C. 154(b) by 995 days.

(21) Appl. No.: 11/829,921

(22) Filed: Jul. 29, 2007

(65) Prior Publication Data

US 2008/0020788 A1 Jan. 24, 2008

Related U.S. Application Data

(63) Continuation-in-part of application No. 10/978,043, filed on Oct. 28, 2004, now abandoned, which is a continuation of application No. 09/665,526, filed on Sep. 19, 2000, now Pat. No. 6,942,574.

(51) Int. Cl.
*H04W 4/00* (2009.01)

(52) U.S. Cl. ........... 455/414.1; 463/20; 463/25; 463/29; 463/40

(58) Field of Classification Search .................. 455/414; 463/25, 40, 20, 29
See application file for complete search history.

(56) References Cited

U.S. PATENT DOCUMENTS

| | | | |
|---|---|---|---|
| 4,517,558 | A | 5/1985 | Davids |
| 4,712,799 | A | 12/1987 | Fraley |
| 4,718,672 | A | 1/1988 | Okada |
| 4,824,121 | A | 4/1989 | Beall et al. |
| 4,991,848 | A | 2/1991 | Greenwood et al. |
| 5,127,651 | A | 7/1992 | Okada |
| 5,178,390 | A | 1/1993 | Okada |
| 5,259,613 | A | 11/1993 | Marnell, II |
| 5,290,033 | A | 3/1994 | Bittner et al. |
| 5,326,104 | A | 7/1994 | Pease et al. |
| 5,375,830 | A | 12/1994 | Takemoto et al. |
| 5,548,348 | A | 8/1996 | Kawabata et al. |
| 5,560,603 | A | 10/1996 | Seelig et al. |
| 5,619,738 | A | 4/1997 | Petruchik et al. |
| 5,643,086 | A | 7/1997 | Alcorn et al. |

(Continued)

FOREIGN PATENT DOCUMENTS

DE 19730017 1/1999

(Continued)

OTHER PUBLICATIONS

Caraballo et al, "The IRC Prelude," [http://www/irchelp.org/irchelp/new2irc.html, Jun. 1, 2000].

(Continued)

*Primary Examiner* — Pierre-Louis Desir
(74) *Attorney, Agent, or Firm* — Weaver Austin Villeneuve & Sampson LLP

(57) ABSTRACT

Described herein are systems and methods that improve personalized service in a casino or other gaming establishment. The systems and methods provide a portable personal service device to a person; the device permits the gaming establishment to communicate with the person—regardless of their location in the gaming establishment. Messages sent to the person may be personalized and customized. The portable personal service device may also be used to track the location of the person in the gaming establishment. The person may also use the portable personal service device to send messages, for example, to call casino personnel to them or make other personal service requests.

24 Claims, 5 Drawing Sheets

U.S. PATENT DOCUMENTS

| | | | |
|---|---|---|---|
| 5,664,998 | A | 9/1997 | Seelig et al. |
| 5,697,843 | A | 12/1997 | Manship et al. |
| 5,722,891 | A | 3/1998 | Inoue |
| 5,761,647 | A | 6/1998 | Boushy |
| 5,788,573 | A | 8/1998 | Baerlocher et al. |
| 5,851,148 | A | 12/1998 | Brune et al. |
| 5,902,983 | A | 5/1999 | Crevelt et al. |
| 5,926,624 | A | 7/1999 | Katz et al. |
| 5,971,849 | A | 10/1999 | Falciglia |
| 5,971,851 | A | 10/1999 | Pascal et al. |
| 5,984,780 | A | 11/1999 | Takemoto et al. |
| 6,029,973 | A | 2/2000 | Takemoto |
| 6,039,648 | A | 3/2000 | Guinn et al. |
| 6,048,269 | A | 4/2000 | Burns et al. |
| 6,089,975 | A | 7/2000 | Dunn |
| 6,104,815 | A | 8/2000 | Alcorn et al. |
| 6,106,396 | A | 8/2000 | Alcorn et al. |
| 6,110,041 | A | 8/2000 | Walker et al. |
| 6,113,495 | A | 9/2000 | Walker et al. |
| 6,132,315 | A | 10/2000 | Miyamoto et al. |
| 6,139,431 | A | 10/2000 | Walker et al. |
| 6,149,522 | A | 11/2000 | Alcorn et al. |
| 6,168,522 | B1 | 1/2001 | Walker et al. |
| 6,206,782 | B1 | 3/2001 | Walker et al. |
| 6,226,589 | B1 | 5/2001 | Maeda et al. |
| 6,234,896 | B1 | 5/2001 | Walker et al. |
| 6,267,671 | B1 | 7/2001 | Hogan |
| 6,270,411 | B1 | 8/2001 | Gura et al. |
| 6,302,790 | B1 | 10/2001 | Brossard |
| 6,312,332 | B1 | 11/2001 | Walker et al. |
| 6,317,793 | B1 | 11/2001 | Toyosawa |
| 6,379,246 | B1 | 4/2002 | Dabrowski |
| 6,640,184 | B1 | 10/2003 | Rabe |
| 6,652,378 | B2 | 11/2003 | Cannon et al. |
| 6,793,575 | B2 | 9/2004 | Brown et al. |
| 6,902,481 | B2 | 6/2005 | Breckner et al. |
| 6,942,574 | B1 | 9/2005 | LeMay et al. |
| 7,424,541 | B2 | 9/2008 | Bourne |
| 7,761,386 | B2 | 7/2010 | Teicher |
| 2001/0011954 | A1 | 8/2001 | Shelton et al. |
| 2001/0046034 | A1 | 11/2001 | Gold et al. |
| 2002/0049507 | A1 | 4/2002 | Hameen-Anttila |
| 2002/0082082 | A1 | 6/2002 | Stamper et al. |
| 2003/0224852 | A1 | 12/2003 | Walker et al. |
| 2004/0097287 | A1 | 5/2004 | Postrel |
| 2004/0162144 | A1 | 8/2004 | Loose et al. |
| 2005/0096125 | A1 | 5/2005 | LeMay et al. |
| 2005/0239546 | A1* | 10/2005 | Hedrick et al. ................. 463/29 |
| 2006/0084488 | A1 | 4/2006 | Kinsley et al. |
| 2006/0095790 | A1 | 5/2006 | Nguyen et al. |
| 2006/0154729 | A1 | 7/2006 | LeMay et al. |
| 2006/0287097 | A1 | 12/2006 | Moshal |
| 2007/0060355 | A1* | 3/2007 | Amaitis et al. .................. 463/40 |
| 2007/0069889 | A1 | 3/2007 | Tuck |
| 2007/0077994 | A1 | 4/2007 | Betteridge |
| 2007/0207857 | A1 | 9/2007 | Angell et al. |
| 2008/0214287 | A1 | 9/2008 | Lutnick et al. |
| 2008/0318655 | A1 | 12/2008 | Davies |

FOREIGN PATENT DOCUMENTS

| | | |
|---|---|---|
| EP | 1 739 639 | 1/2007 |
| GB | 1 494 368 | 12/1977 |
| GB | 2 072 395 | 9/1981 |
| GB | 2 083 936 | 3/1982 |
| GB | 2 106 685 | 4/1983 |
| GB | 2 157 047 | 10/1985 |
| GB | 2 170 938 | 8/1986 |
| GB | 2 181 589 | 4/1987 |
| GB | 2 182 186 | 5/1987 |
| GB | 2 192 478 | 1/1988 |
| GB | 2 254 469 | 10/1992 |
| GB | 2 262 642 | 6/1993 |
| JP | 55 80980 | 11/1978 |
| JP | 63 24970 | 2/1988 |
| JP | 64 58287 | 3/1989 |
| JP | 4 183484 | 6/1992 |
| JP | 6 7498 | 1/1994 |
| JP | 6 35066 | 2/1994 |
| JP | 6 63247 | 3/1994 |
| JP | 8 304911 | 11/1996 |
| WO | 9847115 | 10/1998 |
| WO | 02/024288 | 3/2002 |
| WO | 02/30534 | 4/2002 |
| WO | 2007/067700 | 6/2007 |
| WO | 2009/002978 | 12/2008 |
| WO | 2009/018055 | 2/2009 |

OTHER PUBLICATIONS

Yahoo Internet Site for Nov. 14, 1999, [http://web.archive.org/web/19991114233817/http://www.yahoo.com/index.html].

Marshall Fey, Slot Machines, A Pictorial History of the First 100 Years, 1983, Liberty Belle Books, 87, 158-59.

Microsoft Windows 3.1, 1992, Microsoft Press, pp. 3-17.

Baerlocher, Anthony J., Bittman, Robert A., Brossard, Jean M., entitled "Gaming Machines Providing Bonus Games", U.S. Appl. No. 08/911,254, filed Aug. 8, 1997.

U.S. Office Action dated Sep. 9, 2009 from U.S. Appl. No. 10/978,043.

U.S. Office Action dated Apr. 16, 2007 from U.S. Appl. No. 10/978,043.

U.S. Office Action dated mailed Aug. 31, 2006 from U.S. Appl. No. 10/978,043.

U.S. Office Action dated Oct. 18, 2007 from U.S. Appl. No. 10/978,043.

U.S. Office Action dated Jul. 1, 2008 from U.S. Appl. No. 11/372,948.

U.S. Office Action dated Aug. 8, 2008 from U.S. Appl. No. 10/948,043.

International Search Report and Written Opinion dated Sep. 24, 2008 from Application No. PCT/US2008/068036.

International Search Report and Written Opinion dated Jan. 14, 2009 from Application No. PCT/US2008/070894.

U.S. Office Action dated Mar. 20, 2009 from U.S. Appl. No. 11/372,948.

U.S. Office Action dated Nov. 9, 2009 from U.S. Appl. No. 11/294,846.

U.S. Office Action dated Jun. 3, 2009 from U.S. Appl. No. 11/294,846.

U.S. Office Action dated Mar. 4, 2010 from U.S. Appl. No. 11/294,846.

U.S. Office Action dated Sep. 25, 2002 from U.S. Appl. No. 09/665,526.

U.S. Office Action dated Apr. 15, 2003 from U.S. Appl. No. 09/665,526.

U.S. Advisory Action dated Jun. 3, 2003 from U.S. Appl. No. 09/665,526.

U.S. Office Action dated Jul. 29, 2003 from U.S. Appl. No. 09/665,526.

U.S. Advisory Action dated Oct. 9, 2003 from U.S. Appl. No. 09/665,526.

U.S. Office Action dated Jan. 13, 2004 from U.S. Appl. No. 09/665,526.

U.S. Notice of Allowance dated Jul. 28, 2004 from U.S. Appl. No. 09/665,526.

U.S. Notice of Allowance dated Mar. 24, 2005 from U.S. Appl. No. 09/665,526.

Australian Examination Report dated Mar. 10, 2006 from Application No. 2001290890.

U.S. Office Action dated Oct. 21, 2009 from U.S. Appl. No. 11/372,948.

U.S. Third-Party Submission of Prior Art in a Published Application dated Dec. 19, 2005 from U.S. Appl. No. 10/978,043.

International Search Report dated Jul. 22, 2002 from Application No. PCT/US01/28683.

U.S. Restriction Requirement dated Jun. 9, 2010 from U.S. Appl. No. 10/978,043.

U.S. Office Action dated Jun. 14, 2010 from U.S. Appl. No. 11/372,948.

International Preliminary Examination Report dated Dec. 4, 2002 from Application No. PCT/US01/28683.

International Preliminary Report on Patentability dated Feb. 2, 2010 from Application No. PCT/US2008/070894.
International Preliminary Report on Patentability dated Jan. 5, 2010 from Application No. PCT/US2008/068036.
U.S. Office Action dated Aug. 11, 2010, from U.S. Appl. No. 10/978,043.
U.S. Office Action dated Feb. 2, 2010, from U.S. Appl. No. 11/372,948.
U.S. Office Action dated Sep. 1, 2010 from U.S. Appl. No. 11/294,846.
U.S. Office Action dated Mar. 31, 2011, from U.S. Appl. No. 11/823,021.
Examiner's Declaration.
Unix Manual Page: who, downloaded from http://www.physics.purdue.edu/pen/cgi-bin/viewman.pl?who on Aug. 5, 2007, pp. 1-2.
who(UNIX)—Wikipedia, the free encyclopedia, downloaded from http://en.wikipedia.org/w/index.php?title=Who_%28Unix%29&printable=yes on Aug. 5, 2007, pp. 1-3.
Office Action dated Aug. 8, 2007 in related U.S. Appl. No. 11/372,948.

* cited by examiner

VIRTUAL CASINO HOST

CROSS-REFERENCE TO RELATED APPLICATIONS

This application claims priority under 35 U.S.C. §120 and is a continuation-in-part of U.S. patent application Ser. No. 10/978,043 filed Oct. 28, 2004 and titled "PLAY PER VIEW"; the Ser. No. 10/978,043 application claimed priority under 35 U.S.C. §120 and is a continuation of U.S. patent application Ser. No. 09/665,526, filed Sep. 19, 2000, now U.S. Pat. No. 6,942,574, issued Sep. 13, 2005; each of these patent applications is incorporated herein by reference for all purposes.

FIELD OF THE INVENTION

The present invention generally relates to portable electronics devices that improve patron services at a gaming establishment, such as a casino.

BACKGROUND

Years ago, most casinos had one main entrance and a relatively small and simple layout. When a 'high roller' or other valued customer entered a casino at the predictable entrance, a casino manager would greet the person and attend to their desires individually.

Today, modern casinos are much larger and more complicated buildings. Newer casinos may include multiple entrances, dozens of wings, numerous gaming pits and gambling spots such as card rooms and designated high-roller rooms, internal roller coasters and other theme-park-like amusements, hundreds and sometimes thousands of hotel rooms, enough stores and restaurants to qualify as a shopping mall, platoons of gaming machines, countless paths to go from those multiple entrances to the all these various and myriad destinations, and dozens (or sometimes hundreds) of high value customers on the premises—twenty-four hours a day and seven days a week. Meeting each high value customer to provide personal service is nearly impossible in a modern casino. Personal service has suffered.

SUMMARY

The present invention overcomes these difficulties and improves personalized service in a casino or other gaming establishment by providing a portable personal service device to a person. The portable personal service device permits the gaming establishment to communicate with the person—regardless of their moving and current location in a large gaming establishment. Messages sent to the person may be personalized and customized. The portable personal service device may also be used to track the location of the person. The person may also use the portable personal service device to send messages, for example, to call casino personnel to them, or make other personal service requests.

In one aspect, the present invention relates to a method of providing a personalized service message to a person in a gaming establishment. The method includes associating the person with an identification for a portable personal service device carried by the person in the gaming establishment. The method also includes selecting a non-gambling service that is available through the gaming establishment based on information for the person. The method further includes selecting a service message that corresponds to the selected non-gambling service. The method additionally includes sending the service message to the portable personal service device while the portable personal service device is in the gaming establishment. The method also includes outputting the service message on the portable personal service device.

In another aspect, the present invention relates to a method of providing a personalized service message to a person in a gaming establishment. The method includes providing a portable personal service device to the person. The method also includes associating the person with an identification for a portable personal service device carried by the person in the gaming establishment. The method further includes tracking the location of the person in the gaming establishment using the location of the portable personal service device in the gaming establishment. The method additionally includes selecting a service that is available through the gaming establishment based on personal information for the person. The method also includes selecting a service message that corresponds to the selected service. The method further includes sending the service message to the portable personal service device while the portable personal service device is in the gaming establishment. The method additionally includes outputting the service message on the portable personal service device. The method also includes receiving a message from the portable personal service device that corresponds to the service offering.

In another aspect, the present invention relates to a system of providing a personalized service message to a person in a gaming establishment. The system includes a portable personal service device carried by the person in the gaming establishment. The device includes a wireless communication link, a video display configured to output video, and a processing system configured to output the service message on the video display. The system also includes a server that comprises a) a processing system and a communication link. The processor is configured to: i) associate the person with an identification for the portable personal service device, ii) select the personalized service message for a non-gambling service that is available through the gaming establishment, and iii) send the service message to the portable personal service device while the portable personal service device is in the gaming establishment. The communication link permits information to be transmitted from the host to the portable personal service device.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
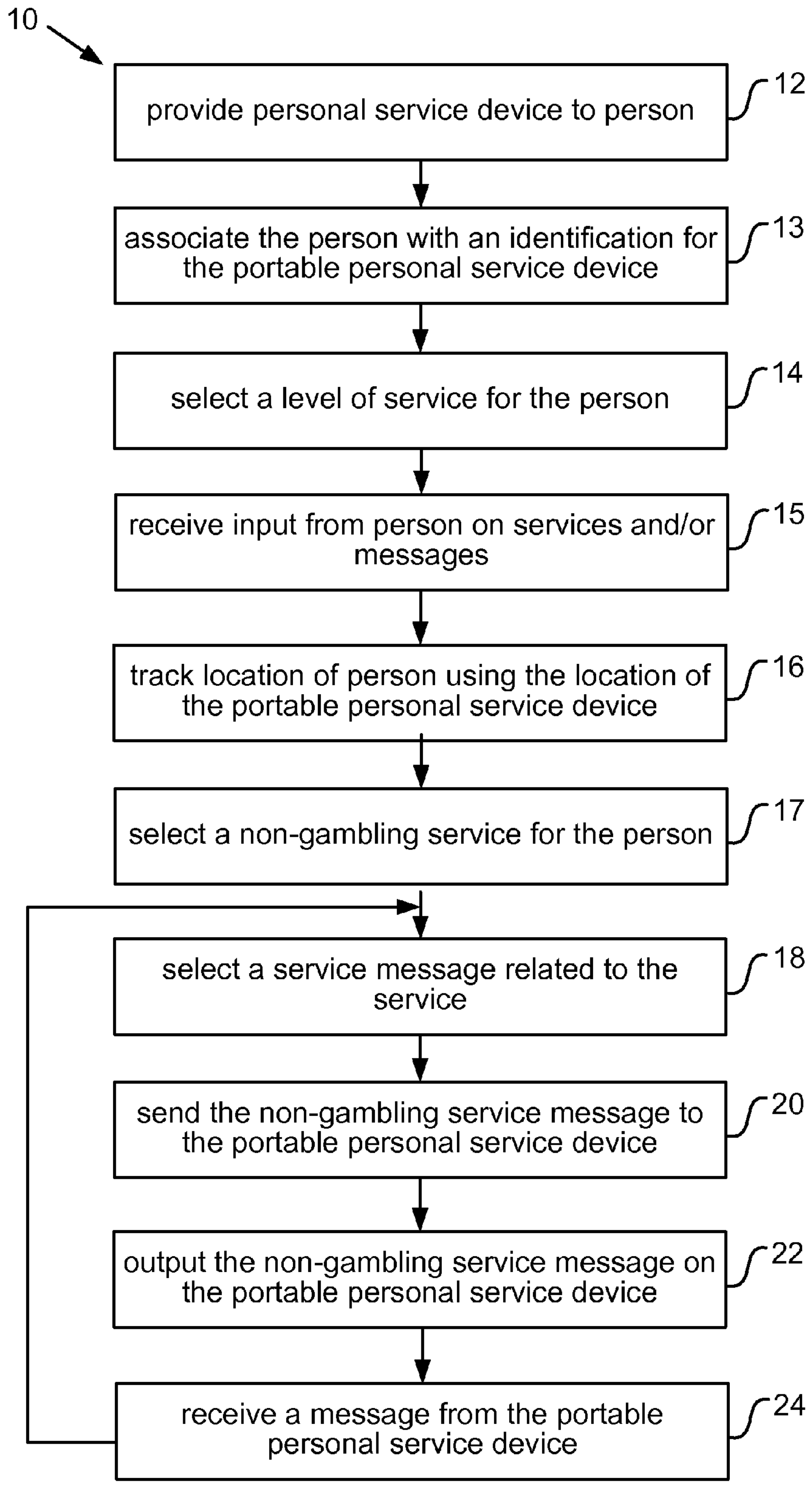
FIG. 1 illustrates a method of providing a personalized service message to a person in a gaming establishment in accordance with one embodiment.

In the following detailed description of the present invention, numerous specific embodiments are set forth in order to provide a thorough understanding of the invention. However, as will be apparent to those skilled in the art, the present invention may be practiced without these specific details or by using alternate elements or processes. In other instances well known processes, components, and designs have not been described in detail so as not to unnecessarily obscure aspects of the present invention.

The present invention improves service provided by a gaming establishment such as a casino. The gaming establishment uses a portable device, carried by the person, for communicating service messages to the person.

The gaming establishment associates the portable device with the person using an identification for the device, and then sends service messages to the person using the portable device and its known contact information and communication path. The portable device allows a gaming establishment to directly inform the person of services and other matters. Sample service examples include the availability of concert tickets, a restaurant reservation, status of a cab or limousine, or other items of interest to the person. Messages sent to the portable device may also be tailored based on the person's identity, demographic information, etc.

In addition, the person may also use the portable device to send messages to the gaming establishment. Using the portable device, the person may contact or summon a concierge or other guest services personnel. A person may ask for tickets to a concert or event. In response, a concierge may carry the tickets or the service request to the person—and to their exact and current location, which is known from the location of the portable device, whose position in the gaming establishment may be tracked. As another example, a high-roller may contact casino personnel when they want something, and casino personnel may respond accordingly. For example, the person may be lost and casino personnel may provide them with directions, or meet them for a personal escort.

As another service example, a patron may reserve game openings. For example, the person may reserve a seat at a poker table, reserve a specific game or gaming machine, or other gaming services provided by the casino. A service message may be then sent to the portable gaming device acknowledging and confirming the request.

Thus, methods, devices and systems described herein permit a casino to communicate with patrons—despite their changing location in a very large building or complex—in real time, and in both directions. Additional services and service messages will be expanded upon below.

As the term is used herein, a gaming establishment refers to any business or organization that seeks to entertain guests on their premises or provide service to those guests. Sample establishments include casinos, resorts, hotels, restaurants, nightclubs, and the like. Many of these establishments include gambling resources such as gaming machines and game tables, although, notably, the portable personal service devices described herein do not provide portable gambling or wagering and are strictly for improving personal service. Although the remaining discussion will use a casino as the gaming establishment for ease of discussion, it is understood that methods and systems described herein are not limited to casinos and well suited for other gaming establishments.

Many casinos these days include large buildings and complex layouts. People get lost in the large casinos, frequently. In addition, most people, especially those in a particular casino for their first time, have difficulty locating specific services that they are interested in. At the least, these people are not gambling or spending money when they are lost. More commonly, they are not having fun, and are likely not to return as a result. Situations like these are undesirable for a casino, especially for high-roller and high value patrons, who may spend tens or hundreds of thousands of dollars in a short period of time. Methods and portable personal service devices described herein alleviate these concerns, and provide other benefits.

FIG. 1 illustrates a method 10 of providing a personalized non-gambling service message to a person in a gaming establishment in accordance with one embodiment. While the providing personalized non-gambling service messages to a portable personal service device will now be described as a method, those skilled in the art will appreciate that method 10 may also apply to a system for providing personalized non-gambling service messages such as that implemented by a player tracking system, host system, or other personal services system operated by a casino.

In this embodiment, the casino provides a portable personal service device to a person (12). The portable personal service device refers to a small electronics device that is capable of receiving messages from the casino and outputting those messages to a person carrying the service device. The device may also be capable of sending messages to a server associated with the casino. Suitable service devices are described below with respect to FIGS. 2A-2C. In a specific embodiment, the gaming establishment offers hotel services and provides the portable service device to the person when the person checks into their lodgings. Alternatively, the casino may mail the service device to the person to entice the person to subsequently come to the casino. For a high roller, the device cost is trivial.

Some casinos may provide a custom made portable personal service device that is tailored to their establishment and image. A casino may thus have its own portable personal service devices made specifically so it can issue these devices to a select number of important patrons. When the casino owns multiple properties in multiple geographic locations, such as different states or different countries, the same portable service personal service device may work across each property for that particular organization. For example, the same portable personal service device may be issued at one property, used at that property, or used at another property such as a second casino in another state or country.

Method 10 associates the person with the portable personal service device (13). Typically, this includes assigning identification to the person, assigning identification for the service device, and associating the two identifications. The personal identification may include a number or any other identifier that partially or fully identifies a person. Full identification refers to uniquely identifying the person apart from all other people. This may include the person's name and/or biometric information for example. Partial identification refers to identifying one or more characteristics of a person that the person shares with others. Partial identification may be based on demographics such as sex (M/F), age, country of origin, education level, annual income, occupation, participation in a group such as a bachelor party, and marital status, for example. Partial identification may also include other personal information such as attendance at a convention or event (e.g., a high-roller party) for example. The service device identification may include a number or any other identifier that uniquely identifies the service device. For example, a custom service device provided by a casino may have a registration number that distinguishes it from other similar devices registered by the casino.

In a specific embodiment, the portable personal service device includes a portable communications device that a person already owns or carries. For example, cell phones and personal digital assistants are suitable for use with method 10. In this case, the identification may include a telephone number, or an email address accessible to a cell phone or personal digital assistant. The cell phone or personal digital assistant may also have software added to it at step 12 in place of providing an actual device.

Figure 3:
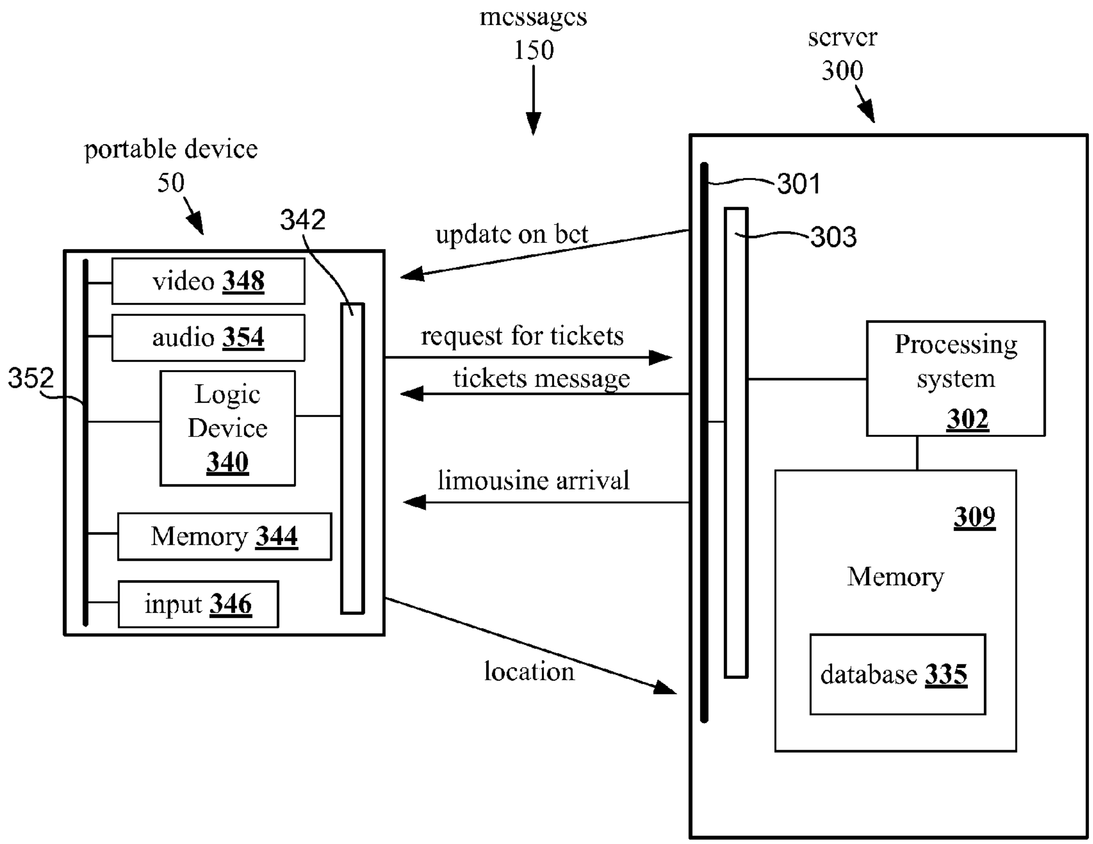
FIG. 3 shows a simplified schematic of functional components for a service system including a server and portable personal service device in accordance with one embodiment.

The identification association links the person with the identification for the portable personal service device such that the two are automatically related for a server or casino personnel trying to locate the person carrying the service device or trying to communicate with the person using the service device. The association may be stored digitally in memory on a server or the like that is accessible to casino personnel. FIG. 3 describes a suitable server for implementing associations, servicing, and messaging as described in method 10.

In general, the person may include anyone in a casino. In one embodiment, the person is a 'high roller', or other valued customer to a casino. Such individuals commonly spend tens of thousands of dollars in a single night or visit. Obviously, a casino values these customers, and wants to provide a high level of service to them. The person may also be a family member or friend of a high roller or other valued customer. For example, a casino may issue a portable personal service device to the wife or girlfriend of a high roller. This keeps the family member or friend well serviced, and happy, which is important to the valued customer, and thus important to the casino.

A portable personal service device may also be issued to multiple people in a group. For example, a casino may provide a service device to multiple people in a bachelor party, a wedding party, business group, party for a high roller, etc. The casino may then commonly associate the service devices for the people in the group, and message them together. For example, a service message may be sent from a front desk personnel at the casino to a service device provided to each person in a golf party when a limousine arrives to transport them to a course. As another example, a concierge for the casino may send a service message to each service device in a bachelor party when a guest of note arrives. The casino may also provide a portable personal service device to a high roller and each of his guests, and link them using the stored associations on a database or server memory. If the devices include two-way communications abilities, this allows each person in the group to communicate with each other. It also allows the valued customer to keep track of his guests (e.g., children), if that service is desired.

Method 10 also selects a service level for the person (14). For example, the casino may have any number of service-levels that differentiate how customers are treated. A high roller may receive one service-level while members of a bachelor party received a lower service-level. In some cases, the level of service is tied to the value of the person as a customer. High rollers commonly want access to controlled events and other special privileges. For example, private parties and other high-end nightclubs are important to certain high roller patrons. A service-level may differentiate access to these controlled events. For example, a top service-level may have primary access to all events that the casino can offer, while a lower service-level does not. As another example, service levels may differentiate what type of ticket is provided to a concert: a high service-level may receive front row tickets to the concert, while a lower level of service obtains lesser tickets.

At the time of receipt, or any time thereafter using the portable device, the person may provide input on what services they are interested (15), which helps determine what messages they will receive using the device. For example, a person who has wagered on sports events at the casino (not using the device) may then elect to receive sports score updates, such as a live ticker or score update messages. Video messages may also be sent for events in the sports wagered upon.

The person may also set and change their messaging settings using the device over time. For example, the person may elect to receive text messages, audio messages, video, combinations thereof, etc. To facilitate this service selection input, the device may provide a questionnaire to the person with a few select questions. For example, the device may give the person to permit the casino to track the person's location using the device so as to permit casino personnel to meet the person despite their moving position in a large casino.

Selecting services may also merge the identification for the portable device with a player tracking program, loyalty point program or other customer service program already used by a casino. Thus, if the person has attended the casino before, previous service and interaction information may be used to provide input on what services the person is interested. This linking of accumulated patron data is particularly useful to a casino with multiple properties in multiple jurisdictions where the person has visited one property in one geographic area and then subsequently visits another.

The person then carries the portable personal service device with them through the casino. For method 10, the portable personal service device is used to track the location of the person in the casino (16). This embodiment is described in further detail below with respect to FIG. 4. Areas visited by the person may include a gaming floor that includes gaming machines and tables, one or more hotel rooms, shops and restaurants, one or more entertainment areas of the casino such as a roller coaster or canal, etc. As will be described below with respect to FIG. 4, RFID or other wireless communication devices may be located throughout the casino to track the moving and current location of the portable personal service device.

This location tracking allows casino personnel to monitor and track the location of the person carrying the device in order to improve personal service. Tracking may occur in real time. Accordingly, when the person requests some form of personal service, such as requesting a drink or poker chips, casino personnel may deliver the service to the person immediately at their current and specific location.

At some point, method 10 selects one or more non-gambling services amongst the non-gambling service offerings available to the casino (17). Notably, the portable device does not permit wagering and gambling. In a specific embodiment, all services available at the casino are provided to the device. In another embodiment, a casino personnel manually selects the service (17) and message (18). In another embodiment, automated systems are used to select a personalized service. To do so, the systems and methods collect personal information for a person, such as demographic information and/or previous service experience data. The collected information is then analyzed and used to select a set of services, from numerous services offered by a casino, that a person corresponding to the personal information is likely to enjoy. The set of services is then offered to the person using one or more service messages on the portable device.

Service selection may include collecting personal service information for the person. The personal service information includes personal information and/or historical service data. Personal information may include demographic information, interests and/or personal preferences, such as favorite movies and actors, etc. For example, people in demographic groups that appreciate services related a past era such as the 1960s (e.g., tickets for the Temptations) are often different than people that favor those from the 1990s (e.g., Pearl Jam tickets). Age may then be used to indicate a proximity to the former or latter. Historical service data may include any information associated with the previous service or experience at the casino, such as where they went to dinner, what events they went to, what drinks and food they order, etc.

The personal service information may come from a variety of sources, such as prior service interaction, demographic sources, marketing information, combinations thereof, etc. Marketing information obtained by businesses associated with a casino represents one source of personal information. Such marketing information is commonly provided with tour groups, special events (e.g., a pro basketball group attending Las Vegas for a few days), and other temporary visitors to a city or casino. In addition, service information may be obtained by a personal questionnaire. The questionnaire may be acquired via paper, telephone, web-based. A person when signing up for a room at a casino/hotel, for example, may fill out a service questionnaire. Player tracking systems represent a continuous source for prior service interaction and demographic information. The player tracking systems gather personal information when the person signs up for the system, and collect historical service data, over time. These systems allow a player to be identified, track service used by the player, and gather any information related to casino interaction. Players agree to have their behavior tracked by a central system in exchange for perceived added value in the form of rewards or other services. The personal service information is stored in a database or memory (see FIG. 3).

In one embodiment, a service-level assigned to the person carrying the portable device contributes to the selection process. 'Service packs' may also be associated with each level of service. This permits the casino to automate service offerings to each person based on their initial service-level assignment. For example, service-levels may include a premium service-level, a 'party' service-level for bachelor parties and golf groups, and other suitable service-levels.

The set of recommended services may change over time. Initially, a first selected service may be based on little information, such as demographic information. This represents an initial guess for the person. The set of recommended services then adapts over time as more information, such as service choices (ordering a drink once or twice), becomes available.

A wide variety of services are suitable for the context of a message and method 10 is not limited by the specific service associated with the message. Services provided by a casino may vary widely. Sample casino services that form the context of a message may include: drinks and food service, lodgings and room service, tickets for entertainment shows or concerts and events, vouchers or the like that may be issued and redeemed or used at selected events, etc. The service may also pertain to any request or service associated with a concierge or personal services associated with a hotel. This may include carrying luggage, transportation services such as ordering transportation, security requests, tickets to sporting events, spa services, promotional clothing, and gifts, for example. The service may also include information important to the person; he may receive, e-mail, stock quotes, news and other information that is of particular interest. Other services are suitable for use herein.

The service may also relate to entertainment content. The entertainment content source may include, for instance, music, a video such as a movie, one or more games for fun (e.g., tetris with no wagering). For video for example, the video may be television programming or a sporting event. The television programming or the sporting event may be obtained from sources generally available to the public (e.g. broadcast events) or may be in-house or special programming (e.g. pay per view).

Method 10 sends one or more non-gambling service messages to the portable personal service device (18). Message transmission and service selection according to steps 17 and 18 need not be temporally related. In many cases, a casino operator may wait for an opportune time to send a message. For example, by tracking the location of the device and its carrier, the casino operator may determine what the person doing at a specific time when a messages is about to be sent. If the person is preoccupied, e.g. is at a blackjack or poker table, then the casino operator may elect to not send the message and wait for a better time.

Message transmission occurs in two stages. First, method 10 selects a non-gambling service message, based on personal information for the person, for provision to the person. The message will vary according to the service (see 17).

Figure 2A:
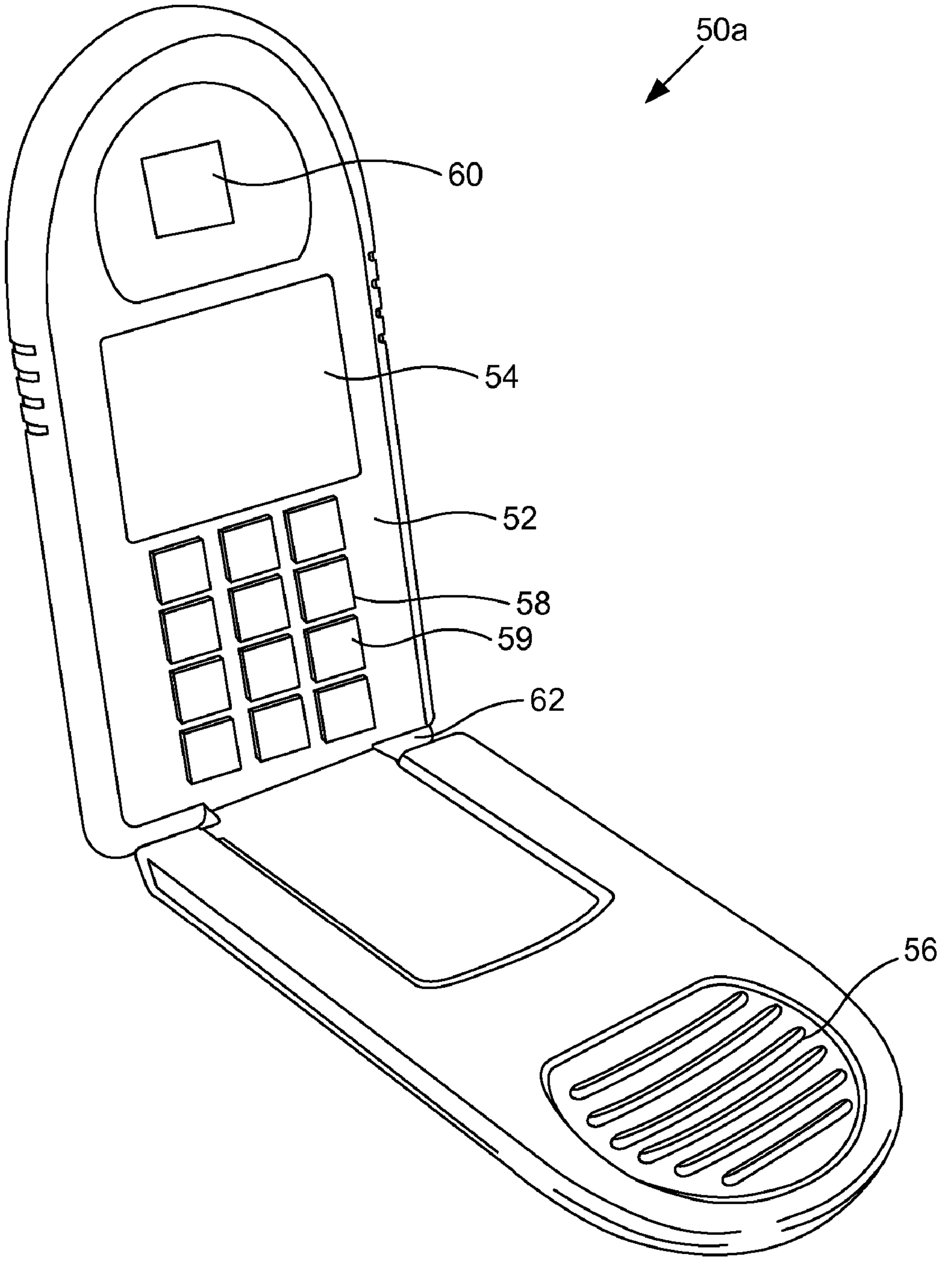
FIG. 2A illustrates a portable personal service device in accordance with one embodiment.
Figure 2B:
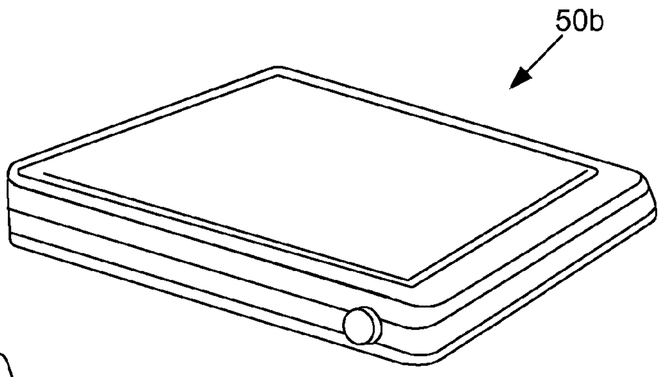
FIGS. 2B and 2C show a portable personal service device in accordance with another embodiment.
Figure 2C:
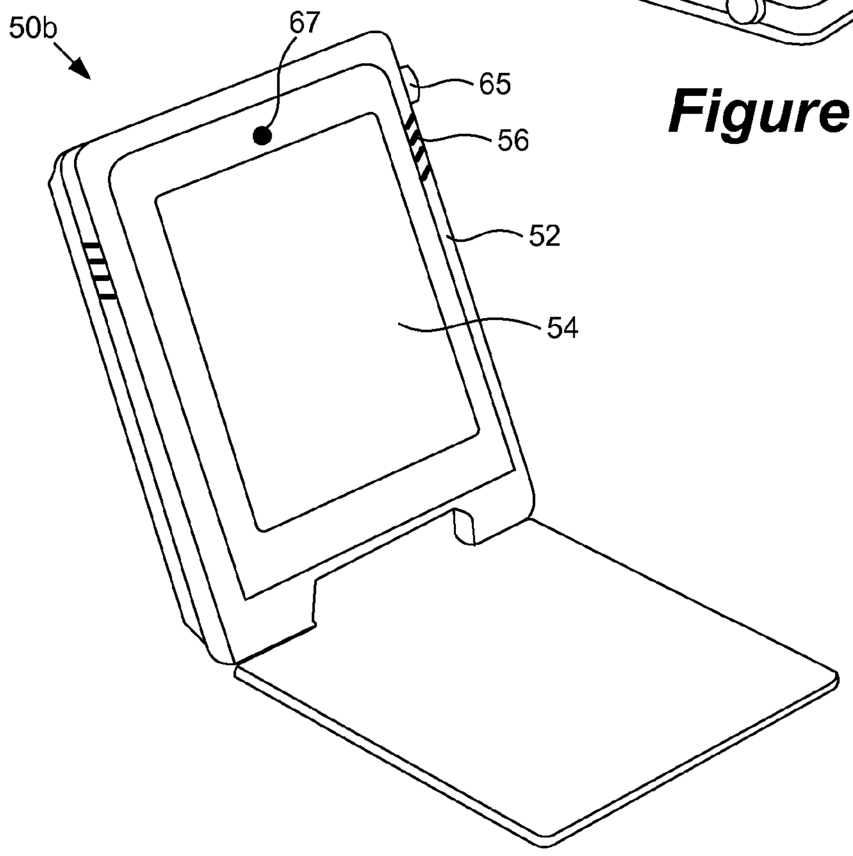

The type of message, its content, and its format may vary with the message output capabilities of the portable personal service device, or may be selected by casino personnel. Messages may include audio messages, text messages, video clips, pictures, and combinations thereof. A server tracks the message output capabilities of each service device, and then selects messages according to the known output capabilities. The type of message may also be selected by casino personnel based on service preference. For example, if the portable personal service device can output multiple message types, then casino personnel may select one or more options for a particular service message. A limousine-arrival message may be sent as a text message, voicemail, picture, or combination thereof. An offer for concert tickets may include video clips of the artist included in the concert, one of the artist's songs (or portion thereof) that is played on the device, still pictures, text, and combinations thereof. Messages sent to a device as shown in FIGS. 2A-2C or portable telephone or PDA may include voice messages, text messages, video clips, pictures, etc.

In general, the present invention is not limited to any particular content of the service message. In one embodiment, the service message pertains to any service offered by a gaming establishment or concierge that can be messaged through the device. Specific content of the message will then depend on the service, and may be tailored as desired. For example, the limousine-arrival message may include the location of the limousine at a particular entrance of a casino. A spa availability message may include a time and location. A golf reservation message may include a golf course name and tee time. A restaurant reservation message may include the restaurant name, location, a menu, open table times, and/or a reservation time. Gaming machine availability may include a jackpot odometer. A concierge summons from the portable device may elicit a return message that acknowledges that a concierge is on his way. Any known demographics information may be used to determine tailored messages. Previous messages to people of a similar demographic group (or people with similar interests) may be used to determine what messages to offer a person when the person's demographic group is known.

Method 10 then sends the non-gambling service message to the portable personal service device (20). This may use any suitable communications link or links between a) a server that initiates and sends the message and b) the portable device. For example, wireless technology is well suited to transmit the message to the person regardless of their location in the casino when the portable device includes a wireless communications link. The server may communicate with wireless devices in the casino through one or more wired connections before the wireless communications link. Method 10 is not limited by the type of communications link used and one of skill in the art is aware of the wide variety of communications options available to a casino.

The non-gambling service message is then output on the portable personal service device (22). This may include video playback, audio output, text display, flashing lights, etc. The message may be output immediately, or stored if the person turned the device off (e.g., for privacy or they went to sleep).

Method 10 may also receive messages from the portable personal service device (24). This may prompt a return message from the casino (and a return to 18 in FIG. 1).

In one embodiment, the message corresponds to a request for non-gambling services. For example, the person may be lost in the casino or looking for a particular shop or restaurant. The return message selected in step 18 may vary and may include audio, video, text, or combinations thereof. Suitable text or audio messages include: "casino personnel are on their way" or "click for map". A video response message may include a series of navigation pictures of landmarks in the casino to guide the person to their desired destination (e.g., the parking lot, a particular game, a restaurant, etc.). Alternatively, the person may request a taxicab using the portable personal service device. The return message selected in step 18 may include multiple messages. A first message to the personal service device informs the person that the request has been acknowledged, and a location in the casino where the cab will arrive. A second message informs the person when the cab arrives, and (again) at which entrance.

As another specific example, the user may send a restaurant reservation message using the portable device (24). The casino server may respond with a first message acknowledgement (18-22) and a second message five minutes before the reservation indicating that a table is ready. This permits the person to keep gambling at a blackjack table for example and not leave prematurely, which is valuable to the casino when the blackjack table requires $100 or more per hand. If the reservation is off-site from the casino campus, then additional messages may be sent for the arrival of transportation. Thus, using the device, the person does not have to stand in line at the restaurant, and can be informed of restaurant reservation status privately and despite moving location in a large casino.

As another example, the portable personal service device may also include a call button configured to request the presence of casino service personnel (24), which then elicits an automated response that a casino staff is en route. Audio on the portable personal service device may also permit communications via the device with the casino staff until that person arrives.

Direct phone numbers or short wave radio communication links may also be provided on the portable personal service device. For example, the device may include a 'hot key' or direct phone number to valet services in the casino, concierge services, another person in a group that received similar devices (e.g., other members of a bachelor party or a wife also in the casino), an escort, etc.

A wide variety of personal service devices are suitable for use. FIGS. 2A-2C show portable personal service devices 50 in accordance with specific embodiments. Devices 50 are portable. A person may carry the portable devices 50 in a pocket or purse for example. Devices 50 are configured for communicating services messages to someone holding it, whose identity is typically known. Notably, device 50 does not permit gambling or wagering.

The portable personal service device 50*a* shown in FIG. 2A includes a body 52, video display 54, speakers 56, key pad 58, biometric reader 60, and a hinge 62.

Body 52 houses and provides mechanical protection for the internal components of device 50 and may include a rigid material such as plastic or a metal. Body 52 may be constructed such that the device 50 is drop and water resistant. Body 52 also includes hinge 62 which permits folding and collapse of two rigid parts of body 52. A flip cover folds down to protect display 54.

Video display 54 outputs video information and may include any suitable video technology, such as a liquid crystal display (LCD) or organic light emitting display (OLED). In a specific embodiment, the portable personal service device 50 runs a graphics-based user interface and outputs the interface on video display 54. The interface facilitates interaction between a user and device 50 and/or between the user and one or more programs run on computer device 50. To do so, video display 54 outputs video information such as a set of icons that each corresponds to a service available via device 50. For example, one icon for easy selection by a user may include a concierge request icon.

Key pad 58 permits a user to input multiple commands to device 50*a* using buttons 59, and navigate the user interface if one is included on device 50*a*. One button may singly dedicated as a call button to request concierge presence.

Biometric reader 60 is configured to capture fingerprint or other biometric information and digitize the information. A processing system 340 (FIG. 3) on device 50*a* then compares the captured biometric data to the biometric data stored on the device to authenticate the person providing the fingerprint to the device. In this manner, device 50*a* has the capability of identifying and authenticating who is using it. For example, a finger print reader 60 may be used on device 50*a* to identify the person carrying it. Device 50*a* permits the use of other forms of biometric data. For example, facial recognition via a camera, voice-recognition using a microphone and retinal detection are forms of biometric validation suitable for use with device 50*a*.

FIGS. 2B and 2C show a portable personal service device 50*b* in accordance with another embodiment. Device 50*b* includes pen and stylus 65 and a message notification light 67. Pen and stylus 65 permit a user to manually enter input to a touch screen added to video display 54, and may be stored in a spring-loaded channel when not used by the person. Message notification light 67 illuminates when a message is received by device 50*b*. In another specific embodiment, device 50*b* vibrates to announce an incoming message, or permits a selection or combination of audio notification, video notification, and/or vibration.

Although not shown, device 50 may also include a microphone, e.g., embedded below body 50 in the area shown for speakers 56 for example, for voice input, which allows the person to speak to casino personnel.

FIG. 3 shows a simplified schematic of functional components for server 300 and portable personal service device 50 in accordance with one embodiment. Server 300 sends service messages to, and receives messages from, device 50. The server may be responsible for a) storage of all service messages; b) selection of services for the person; and/or c) selection of service messages according to a particular service that has been selected.

Server 300 includes a firewall 301, processor system 302, communications interface 303, and a memory 309 that stores database 335.

Processing system 302 is designed or configured to execute one or more software applications that select services and/or service messages. In addition, the processing system 302 may designed or configured to execute software applications that allows preference account information stored and accessed to help determine service and/or service message selection. Processing system 302 may include any commercially available logic device or system known to those of skill in the art.

Memory 309 may include a hard drive or some other appropriate storage medium. Memory 309 stores one or more of: a list of available services (e.g., to a casino), messages 150 for transmission to device 50, personal service selection software and information for one or more people, and personal service message selection software and information for one or more people. In this case, a database 335 in memory 309 is used to associate multiple messages with a particular service, to associate one or more devices with a person, and particular people with particular services.

Processing system 302 operates on stored instructions in memory 309 to select services and service messages based on one or more criteria. Memory 309 then stores: personal service information for each person, personal service selection information, the selection criteria, and/or a set of recommended services for each person. The set of recommended services is updated, as desired, as the system obtains new information about person.

Data mining systems and methods included in server 300 filter the stored personal service selection information and select a set of recommended services for a person. The selected services refer to services that a person is likely to enjoy based on personal service selection information for that person. Different people enjoy different services, and server 300 tailors service offerings towards individuals based a) on their personal and stored information, and b) data mining criteria established to convert personal service selection information into a set of recommended services. This filtering process reduces a total number of services offered by a gaming establishment to a lesser number that is likely to interest a person. In one embodiment, an automated and computer-implemented data mining analysis filters personal service selection information using a) personal information and b) selection criteria for the personal information. The automated filter outputs a set of recommended services for each person, given only a list of available services, personal information, and a selection criterion.

Memory 309 stores instructions and software for implementing methods and techniques as described herein, and may include any suitable memory source. Such memory components are available from a wide variety of vendors. Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher-level code that may be executed by the computer using an interpreter.

Communications interface 303 controls the sending and receiving of data to and from server 300. Suitable hardware interfaces and their respective protocols may include USB interfaces, Ethernet interfaces, cable interfaces, wireless interfaces, dial up interfaces, and the like. In one embodiment, interface 303 uses a high frequency two-way radio link for communications. Suitable wireless communication standards may include IEEE 802.11a, IEEE 802.11b, IEEE 802.11x (e.g. another IEEE 802.11 standard such as 802.11c or 802.11e), hyperlan/2, Bluetooth, and HomeRF for example. In some embodiments, communications interface 303 permits server 300 to be accessed via a web browser.

Device 50 is generally a hand-held device. Functionally, device 50 includes a processor, or CPU, 340, one or more memories 344, input device 346, display device 348, and system bus 352. System bus 352 permits digital communication between system processor 340 and memory 344, as well as permits communication between other items within device 50.

Processor 340 is a commercially available microprocessor such as one of the Intel or Motorola family of chips or chipsets, or another suitable commercially available processor. Processor 340 digitally communicates with memory 344 via system bus 352, which may comprise a data bus, control bus, and address bus for communication between processor 340 and memory 344. CPU 340 is also coupled to I/O circuitry via bus 352 to permit data transfers with peripheral devices.

Memory 344 includes a read only memory (ROM) and/or random access memory. Other memories may be included, such as another RAM module that separately couples to bus 352. Memory 344 may store a basic input/output system (BIOS), containing basic routines that help to transfer information between elements within computer device 50, such as during start-up. A number of program modules may be stored in memory 344, including an operating system, one or more application programs, other program modules, and program data. Those skilled in the art will appreciate that other types of data storage are suitable for use with device 50, such as flash memory cards, USB memory sticks, and the like. In addition, not all computer systems, such as PDAs and other portable devices may include multiple external memory options.

Input 346 permits a user to input data to the device. The input mechanisms may include one or more of: a touch screen, an input switch, a camera, a scroll wheel, an input button, and/or biometric input device such as a finger print reader. Other inputs are also suitable for use.

Display device 348 is for displaying objects, video information, graphics-based user interfaces, and other visual representations of data. Display device 348 may comprise a liquid crystal display (LCD) or organic light emitting diode (OLED of the types commercially available from a variety of manufacturers. In one embodiment, a touch screen (sensor) is overlaid on the displayable surface of the display device.

Audio output 354 may comprise one or more speakers employed by a headphone or speaker system. While not shown, lighting schemes, such as arrays of LEDs, may be added to device 50 to provide visual effects and to communicate messages to a person. Status information, such as a battery level and connection status, may be provided by the status lights.

Communications interface 342 includes wireless communication hardware and software, such as hardware configured for communication according to 802.11 protocols. In particular embodiments, the wireless communication interface 342 may use a wireless communication protocol selected from the group consisting of IEEE 802.11a, IEEE 802.11b, IEEE 802.11x, hyperlan/2, Bluetooth, and HomeRF.

In operation, server 300 and device 50 are configured to transmit messages 150 to each other. Several sample messages are shown. The messages serve to enhance the person's experience with a more personalized environment that communicates directly to the person and sends responses or inquiries from the person to the host server 300 (and associated casino service personnel).

When device 50 receives messages 150 from server 300, a controller (such as processor 340) that controls device 50 may perform any instructions or execute any programs associated with the message.

The portable device 50 may also send messages 150 to server 300 that include information to be stored in server 300 such as the location of device 50. Server 300 receives the messages via a communication interface 303 connected through a firewall 301.

Processing system 302 within server 300 is designed or configured to execute one or more software applications that select service messages for a person carrying device 50. While not shown, server 300 may also include communication with other systems including: service personnel for the casino, hotel operation, POS systems, retail and beverage outlets, and other systems that may be unique to a casino or other gaming enterprise.

In one embodiment, server 300 implements a model that automatically selects service messages. The model may include data automated methods that filter service messages for a person and service. Different people will enjoy different services and messages, and the automatic process, e.g., as implemented in software, selects service messages for an individual based a) on partial or full identification, and b) data mining criteria established to convert service data information and entertainment resources data into tailored service messages.

The present invention contemplates a wide range of suitable selection criteria for filtering service messages. In one embodiment, the tailored service message process has a specific message waiting in response to a particular request sent from device. For example, when a person requests tickets for a show, server may select from one or more messages such as "See concierge", "Concierge on its way" or "Sold out" and send the tickets message back to the device 50.

In one embodiment, the tailored service message selection process is configurable. First, a system designer may determine which service messages are used. Second, the system designer also determines which messages are provided to the person. In one embodiment, the person associated with device 50 is assigned a service level. For example, as mentioned above, high rollers may be assigned a better service level than members of a bachelor party. This allows the casino to provide different services and service messages to predetermined service levels and service packs. The messages 150 may also vary with service level (e.g., to a bachelor party vs. a politician). This permits a casino service personal or system designer to sculpt the tailored message selection process. Casinos and other gaming establishments 13 value their own expertise in patronage. Configurability in the message selection process permits a casino to control and tailor service messages to its patrons, to promote various services or improve service according to their own standards and values of customer patronage. In general, configurability allows any system designer or gaming establishment to controllably offer service messages for each person and each gaming establishment.

As time passes, a designer may change the services and service messages. For example, a casino may offer new services, encourage certain business purposes (e.g., a new show they are promoting), etc. The service messages 150 may also be updated for a person or a demographic that the person belongs to, which may also produce new service messages for that person.

As a result of the service messages a player might have a generally more pleasant experience with a casino. Over time, offering tailored service messages may also increase player enjoyment and participation, increase patronage and increase revenues from entertainment services.

The selection software suitable for use for selecting service messages may vary. For example, a database 335 stored in memory 309, such as a relational database, may be configured to produce tailored service messages using stored logic, demographic information and service resources data. In one embodiment, the selection software includes commercially available software adapted to select tailored offerings. One suitable software package includes SQL Server 2005 as provided by Microsoft, Inc. of Redmond, Wash., and adapted to select tailored offerings as described herein.

Selection may also include human input. In one embodiment, server 300 also stores dynamic data that is compiled and delivered to key casino management and service personnel for real-time decisions. With the real-time wireless people tracking described below, a casino manager could make real-time decisions of what services should be offered a high roller moving in the casino.

In one embodiment, server 300 implements player tracking services and uses device 50 as a portable communications interface for the player tracking services. In this case, messages 150 between device 50 and server 300 may include any messages for player tracking or servicing as described herein. Server 300 may then include the resources of a player tracking server and be configured to implement player tracking services. A player using device 50 may then be able to utilize services traditionally offered through player tracking devices on a gaming machine, such as a drink request. To provide the player tracking services, a player tracking service interface may be displayed on the touch screen of the wireless device 50. Details of player tracking services and other gaming services that may be provided through a wireless device 50 of the present invention are described in commonly owned U.S. Pat. No. 6,908,387 and entitled "PLAYER TRACKING COMMUNICATION MECHANISMS IN A GAMING MACHINE" which is incorporated herein in its entirety and for all purposes. The player tracking server may then implement tiered services levels as described above.

In a specific embodiment, device 50 only serves as an interface to the player tracking server 300. Thus, device 50 allows its user to access player tracking accounts and loyalty program accounts to use comps, order drinks and food, make restaurant reservations, order tickets to shows, or perform any other tasks associated with the player tracking account.

In addition to messaging, device 50 may also be used for other services. In one embodiment, device 50 stores valet information in memory 344, which allows device 50 to serve as a valet ticket. As mentioned, device 50 may also serve as a player tracking device in place of a player tracking card. In another specific embodiment, device serves as a room access card when the door to the room includes a wireless lock. In each case, each added function only requires casino personnel to activate the function via server 300. Notably, though, each function added to device 50 reduces the number of items that a person needs to carry, thus simplifying their stay at the casino.

Figure 4:
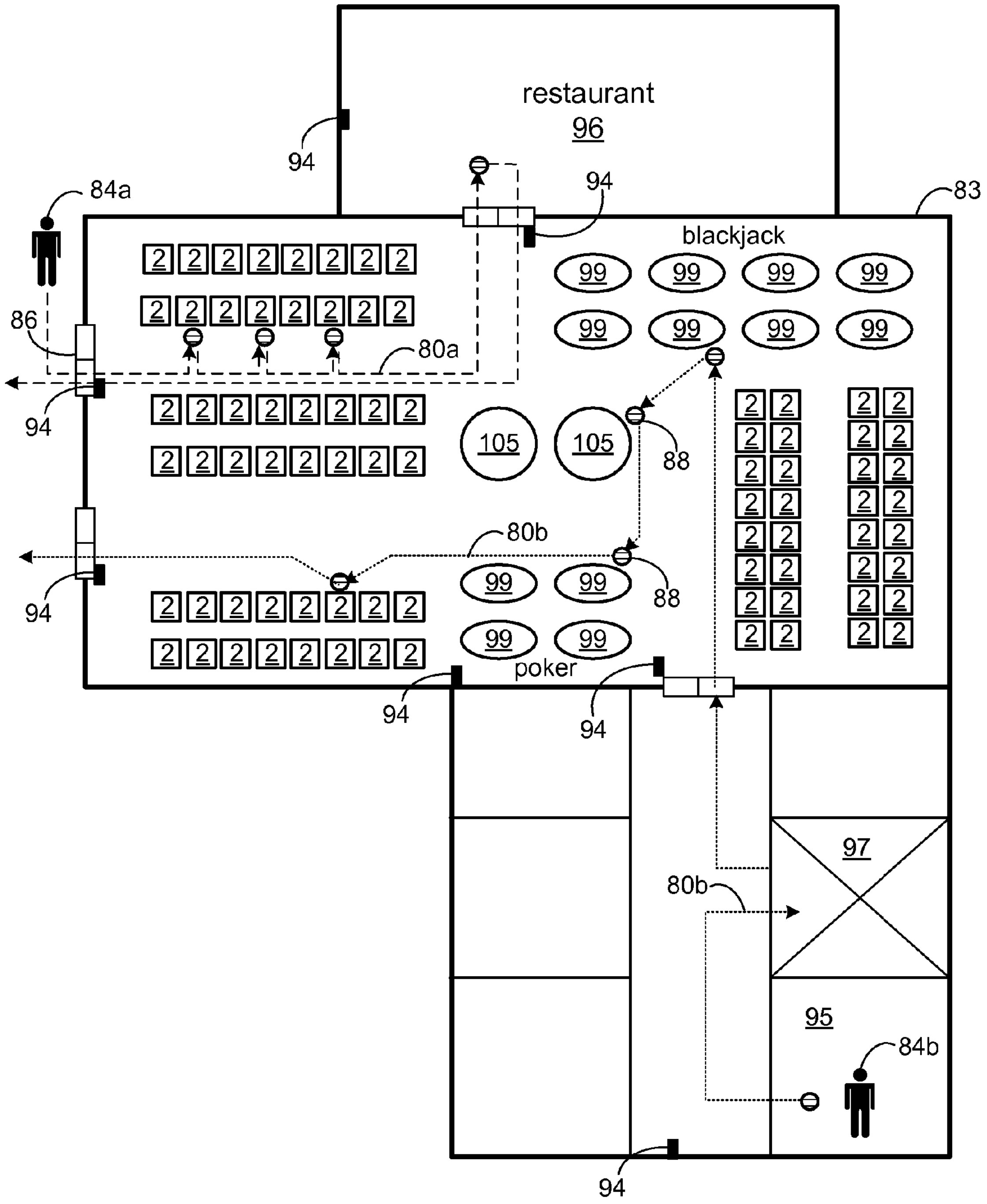
FIG. 4 shows the tracking and sample traffic patterns for two people, respectively, each carrying a portable personal services device in a casino in accordance with a specific embodiment.

As mentioned above, device 50 may be used to track the location of a person in a casino. FIG. 4 shows the tracking and sample traffic patterns 80*a* and 80*b* for two people 84*a* and 84*b*, respectively, each carrying a portable personal services device 50, in a casino 83 in accordance with a specific embodiment. Casino 83 as shown has been greatly simplified in size and complexity for sake of illustration. One of skill in the art is aware that casinos can be much larger and more complex, and include many many more items than that shown in FIG. 4.

The portable personal services device 50 allows the casino to track the person and locate them anywhere along a traffic pattern. As the term is used herein, a traffic pattern refers to the route(s) a person takes in a casino property. A person may make countless routes in a casino. For example, person 84*a* entered the casino through external doors 86, played a game at three different gaming machines 2, had lunch at restaurant 96, and then left casino 93 through doors 84. As another example, person 84*b* began route 80*b* from a hotel room 95 in the casino, took an elevator 97 down to the casino floor, and then proceeded to a blackjack table 99, then to kiosk 105, then to a poker table 99, and then out an external casino door 86.

Data from each traffic pattern 80 is intermittently sent to a central server. In one embodiment, the server stores the most recent location and traffic pattern data for that person via identification of the portable personal services device 50 carried by the person. To do so, casino 93 includes numerous readers 94, such as RFID readers, disposed throughout the property.

In one embodiment, the portable personal services device 50 includes an RFID tag. When the RFID tag passes through the electromagnetic zone of a reader 94 in casino 93, the tag detects the reader's activation signal. The reader decodes the data encoded in the tag and the data is passed to the server. This allows each person 84 carrying a portable personal services device 50 to be tracked throughout the casino.

The casino may include additional readers in other locations. For example, if the casino 93 has a retail shop, then each retail shop may be tagged with an RFID reader 94. In this manner, a patron can be tracked from the time they walk through the door of a casino until the time they leave.

While this invention has been described in terms of several preferred embodiments, there are alterations, permutations, and equivalents which fall within the scope of this invention which have been omitted for brevity's sake. For example, the device may also include other functions associated with a portable handheld device, such as an organizer program, a web browser, instant messaging, scheduler, appointments manager, etc. It is therefore intended that the scope of the invention should be determined with reference to the appended claims.

What is claimed is:

1. A method of providing a personalized service message to a group of persons in a gaming establishment, the method comprising:
- assigning one or more persons to the group of persons;
- assigning each person in the group of persons a unique personal identification;
- associating each unique personal identification with a unique identification for a portable personal service device carried in the gaming establishment by the person assigned the personal identification;
- linking the portable personal service devices for the group of persons using the associations;
- selecting a non-gambling service available through the gaming establishment based on information for the persons;
- selecting a service message that corresponds to the selected non-gambling service available through the gaming establishment;
- sending the service message to the linked portable personal service device associated with each person in the group of persons while the portable personal service device is in the gaming establishment; and
- outputting the service message on the portable personal service devices.

2. The method of claim 1, further comprising providing, to a person in the group of persons, the personal service device with the unique identification associated with the unique personal identification assigned to the person.

3. The method of claim 2, wherein the providing and the associating occur when the person registers at the gaming establishment.

4. The method of claim 3, wherein the person is registered to lodge at the gaming establishment and the portable personal service device is associated with the person for the duration of their lodging.

5. The method of claim 2, further comprising tracking the location of the person in the gaming establishment using the location of the portable personal service device carried by the person in the gaming establishment.

6. The method of claim 1, further comprising receiving a message from one of the portable personal service devices.

7. The method of claim 6, wherein the message corresponds to the service message.

8. The method of claim 1, further comprising initiating a communication link between one or more of the portable personal service devices and a communications device carried by a guest services staff member for the gaming establishment.

9. The method of claim 1, wherein one or more of the persons in the group of persons is assigned a party service level, a politician service level, a high-roller service level, or a premium service level.

10. The method of claim 1, wherein a person in the group of persons is associated with the unique identification anonymously.

11. The method of claim 1, wherein the message sent to the portable personal service devices is personalized for the persons in the group of persons based on demographic information known for the persons.

12. The method of claim 1, wherein the portable personal service devices include custom-made portable personal service devices specific to the gaming establishment.

13. The method of claim 1, wherein the service message includes video.

14. A method of providing a personalized service message to a group of persons in a gaming establishment, the method comprising:
- assigning one or more persons to the group of persons;
- providing a portable personal service device to each person in the group of persons;
- associating each person with a unique identification for the portable personal service device provided to the person;
- linking the portable personal service devices for the group of persons using the associations;
- tracking the location of each person when the person is in the gaming establishment using the location of the portable personal service device provided to the person;

selecting a service from service offerings that are available through the gaming establishment based on personal information for the persons in the group of persons;

selecting a service message that corresponds to the selected service;

sending, for the linked portable personal service devices within the gaming establishment, the service message to the linked portable personal service devices;

outputting the service message on the linked portable personal service devices in receipt of the service message and within the gaming establishment; and receiving a message from one or more of the linked portable personal service devices that corresponds to the service offering.

15. The method of claim 14, wherein the providing the personal service device to each person occurs when the person registers at the gaming establishment.

16. The method of claim 15, wherein the person is registered to lodge at the gaming establishment and the portable personal service device is associated with the person for the duration of their lodging.

17. The method of claim 14, wherein a person in the group of persons is associated with the unique identification anonymously.

18. The method of claim 14, wherein the message sent to the portable personal service device is personalized for the persons in the group of persons based on demographic information known for the persons.

19. A system comprising:

a server configured to:

i) assign one or more persons to the group of persons;

ii) associate each person in a group of persons with a unique identification for a portable personal service device carried by the person, iii) link the portable personal service devices associated with the persons in the group of persons, iv) select a non-gambling service from service offerings available through a gaming establishment, and v) send a service message to the linked portable personal services devices within the gaming establishment;

wherein each portable personal service device comprises:

a wireless communication interface, a video display configured to output video, and a processing system configured to output the service message on the video display, wherein the portable personal service device is designed to be carried by a person in a gaming establishment, wherein the wireless communication interface is configured to transmit information between the server and the portable personal service device across a wireless communication link.

20. The system of claim 19, wherein the wireless communication link comprises a set of wireless communication devices located in the gaming establishment and configured to locally communicate with the portable personal service using a wireless signal.

21. The system of claim 20, wherein the server is further configured to track the location of each portable personal service device within the gaming establishment.

22. The system of claim 19, one or more of the persons in the group of persons is assigned a party service level, a politician service level, a high-roller service level, or a premium service level.

23. The system of claim 19, wherein a person in the group of persons is associated with the unique identification anonymously.

24. The system of claim 19, wherein the message sent to the linked portable personal service devices is personalized for the persons in the group of persons based on demographic information known for the persons in the group of persons.

* * * * *